United States Patent [19]

Inui

[11] Patent Number: 4,519,264
[45] Date of Patent: May 28, 1985

[54] GEAR ASSEMBLY FOR ELIMINATING KNOCKING NOISES IN TRANSMISSION

[75] Inventor: Masaki Inui, Toyota, Japan

[73] Assignee: Toyota Jidosha Kabushiki Kaisha, Japan

[21] Appl. No.: 453,840

[22] Filed: Dec. 28, 1982

[51] Int. Cl.³ .............................................. F16H 55/18
[52] U.S. Cl. ................................... 74/409; 74/421 R; 74/440
[58] Field of Search .................. 74/424.5, 413, 421 R, 74/409, 440

[56] References Cited

U.S. PATENT DOCUMENTS

| | | | |
|---|---|---|---|
| 1,619,799 | 3/1947 | Rounds et al. | 74/440 |
| 1,648,715 | 11/1927 | Bean | 74/440 |
| 1,755,945 | 4/1930 | Alexandrescu | 74/440 |
| 1,968,338 | 7/1934 | Earles et al. | 74/440 |
| 3,037,396 | 6/1962 | Martin | 74/409 |
| 3,327,548 | 6/1967 | Welch | 74/424.5 |
| 3,496,794 | 2/1970 | Forichon | 74/440 |
| 3,888,134 | 6/1975 | Miranda | 74/421 R |
| 4,036,074 | 7/1977 | Bodnar | 74/409 |
| 4,292,857 | 10/1981 | Matusz | 74/409 X |

FOREIGN PATENT DOCUMENTS 48-44544[U] 12/1973 Japan.
1227075 3/1971 United Kingdom ................. 74/458

OTHER PUBLICATIONS

Analytical Mechanisms of Gears, Buckingham, 1949, pp. 141–143.

Primary Examiner—Allan D. Herrmann
Assistant Examiner—Shirish Desai
Attorney, Agent, or Firm—Finnegan, Henderson, Farabow, Garrett & Dunner

[57] ABSTRACT

A gear assembly includes a pair of driving and driven helical gears permanently in meshing engagement with each other to provide a torque transmission therebetween, and an additional plate-like gear formed at its outer periphery with helical teeth the helix angle of which is different from each helix angle of respective teeth of the helical gears and being resiliently deformable in an axial direction. The additional plate-like gear is coaxially and rotatably mounted in place on a hub portion of the driven helical gear and meshed at its two teeth with one tooth of the driving gear such that the additional plate-like gear is resiliently in contact with one end face of the driven gear at a place radially opposite to the meshed portion of the helical gears.

5 Claims, 3 Drawing Figures

GEAR ASSEMBLY FOR ELIMINATING KNOCKING NOISES IN TRANSMISSION

BACKGROUND OF THE INVENTION

The present invention relates to an automobile gear transmission driven by an internal combustion engine, and more particularly to a gear assembly adapted to the gear transmission for eliminating gear knocking noises in operation.

As is well known, there occur gear knocking noises in the gear transmission due to inevitable fluctuation of the engine rotation and backlash of the assembled gears. Such gear knocking noises will occur particularly in idling operation of the engine under the neutral condition of the gear transmission. For the purpose of eliminating the gear knocking noises, as is disclosed in a Japanese Utility Model Publication No. 48-44544, a gear assembly has been proposed which includes a pair of driving and driven gears permanently in meshing engagement with each other to provide a torque transmission therebetween, and an additional plate-like gear relatively rotatable at one side of either one of the gears and being permanently in meshing engagement with the other gear to rotate at a gear ratio different from that of the driving and driven gears, and in which the additional plate-like gear is resiliently in contact with one end face of the gear adjacent thereto to restrain a relative rotation between the driving and driven gears. In such a gear assembly, the additional plate-like gear is eccentrically mounted on a hub portion of the gear adjacent thereto to eliminate backlash between the driving and driven gears. This results in dynamic unbalance of the additional gear, causing another unexpected problem.

SUMMARY OF THE INVENTION

It is, therefore, a primary object of the present invention to provide an improved gear assembly capable of eliminating backlash between driving and driven gears in a simple construction without such dynamic unbalance of the additional gear as described above.

According to the present invention there is provided an improved gear assembly which includes a pair of driving and driven helical gears permanently in meshing engagement with each other to provide a torque transmission therebetween, and an additional plate-like gear formed at its outer periphery with helical teeth the helix angle of which is different from each helix angle of respective teeth of the driving and driven gears and being resiliently deformable in an axial direction, the additional plate-like gear being coaxially and rotatably mounted in place on a hub portion of either one of the driving and driven gears and meshed at its two teeth with one tooth of the other gear such that the additional plate-like gears is resiliently in contact with one end face of the helical gear adjacent thereto at a place radially opposite to the meshed portion of the driving and driven gears.

BRIEF DESCRIPTION OF THE DRAWING

Additional objects and advantages of the present invention will be more readily apparent from the following detailed description of preferred embodiments thereof when taken together with the accompanying drawing, in which.

DETAILED DESCRIPTION OF THE PREFERRED EMBODIMENTS

Figure 1:
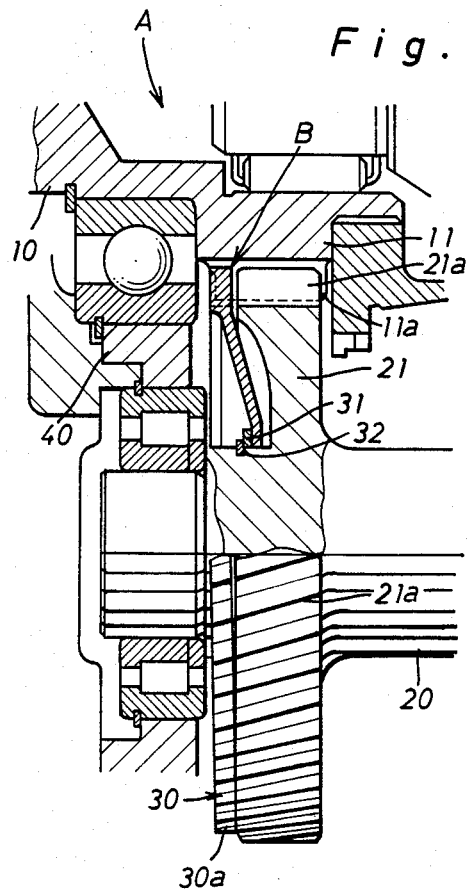
FIG. 1 illustrates in section a gear assembly in accordance with the present invention.

Referring now to the drawing, particularly in FIG. 1 there is illustrated a gear assembly B in accordance with the present invention which is adapted to a portion in an automobile gear transmission A. The gear transmission includes an input shaft 10 and a countershaft 20 which are rotatably supported in parallel with each other from a housing assembly 40 for the transmission. The input shaft 10 is arranged to receive an input torque thereon from an internal combustion engine by way of a clutch assembly (not shown). The input shaft 10 is integrally provided thereon with a driving gear 11 in the form of a helical gear which is permanently in meshing engagement with a driven gear 21 in the form of a helical gear integral with countershaft 20. In such arrangement, an additional plate-like gear 30 is coaxially and rotatably mounted on a hub portion of driven gear 21 for relative rotation with the driven gear 21 and is positioned in place through a spacer ring 31 by means of a snap ring 32 fixed to the hub portion of driven gear 21.

Figure 2:
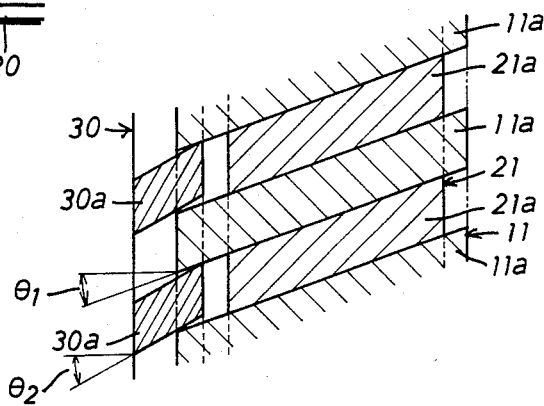
FIG. 2 schematically illustrates the meshing engagement of gears in the gear assembly of FIG. 1, which is depicted along the pitch circle of the gears.

The additional plate-like gear 30 is made of a pressed sheet metal to be resiliently deformable in an axial direction. The additional plate-like gear 30 is formed at its outer periphery with helical teeth 30a the helix angle $\theta_2$ of which is larger than each helix angle $\theta_1$ of respective teeth 11a, 21a of gears 11 and 21, as is illustrated in FIG. 2. In such gear assembly, the two teeth 30a of gear 30 are resiliently in meshing engagement with one tooth 11a of gear 11 at the meshed portion of gears 11 and 21, while the additional plate-like gear 30 is resiliently in contact with the left end face of gear 21 at a place radially opposite to the meshed portion of gears 11 and 21, as is illustrated in FIG. 1.

Figure 3:
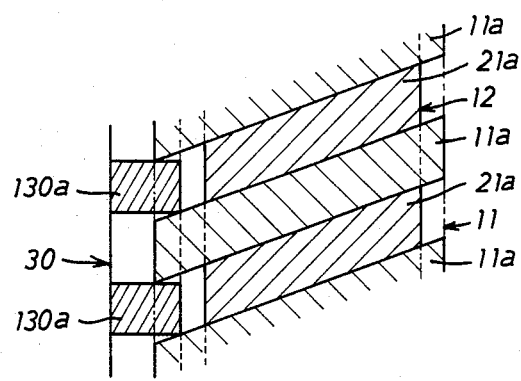
FIG. 3 schematically illustrates the meshing engagement of gears in a modification of the gear assembly.

In operation, the driven gear 21 and the additional plate-like gear 30 are simultaneously driven by the driving gear 11 during rotation of the input shaft 10 such that the two teeth 30a of gear 30 are successively meshed with one tooth 11a of gear 11 to cause frictional engagement of gear 30 with the left end face of gear 21 at the opposite side thereof. This gives rise to a drag torque at the engagement face between the driven gear 21 and the additional plate-like gear 30, which drag torque acts to eliminate backlash between gears 11 and 21 so as to eliminate knocking noises in operation of gears 11 and 21. The gear assembly described above is further characterized in that the additional plate-like gear 30 is concentrically rotatable on the hub portion of gear 21 in a simple construction to ensure the dynamic balance of gear 30 in operation. In the actual practices of the present invention, the helix angle $\theta_2$ of gear teeth 30a may be determined to be zero or smaller than each helix angle $\theta_1$ of respective teeth 11a, 21a, as is illustrated by the reference numeral 130a in FIG. 3. Alternatively, the additional plate-like gear 30 may be mounted on a hub portion of driving gear 11.

Although certain specific embodiments of the present invention have been illustrated and described, it is obvious that many modifications thereof are possible. The invention, therefore, is not intended to be restricted to the exact showing of the drawing and description thereof, but is considered to include reasonable and obvious equivalents.

What is claimed is:

1. A gear assembly including a pair of driving and driven helical gears permanently in meshing engagement with each other to provide a torque transmission therebetween, and an additional plate-like gear formed at its outer periphery with helical teeth the helix angle of which is different from each helix angle of respective teeth of said driving and driven helical gears and being resiliently deformable in an axial direction, said additional plate-like gear being concentrically rotatable on a hub portion of either one of said driving and driven helical gears and being successively meshed at the two teeth thereof with one tooth of the other gear in such a manner that said additional plate-like gear is resiliently in contact with one end face of said helical gear adjacent thereto at its radially opposed portion.

2. A gear assembly as claimed in claim 1, wherein said additional plate-like gear is in the form of a plate-like gear of a pressed sheet metal.

3. A gear assembly as claimed in claim 1, wherein said additional plate-like gear is concentrically rotatable on a hub portion of said driven gear and arranged to be successively meshed at the two teeth thereof with one tooth of said driving gear in such a manner that said additional plate-like gear is resiliently in contact with one end face of said driven gear at its radially opposed portion.

4. A gear assembly as claimed in claim 1, wherein the helix angle of said additional plate-like gear is larger than each helix angle of respective teeth of said driving and driven helical gears.

5. A gear assembly as claimed in claim 1, wherein the helix angle of said additional plate-like gear is smaller than each helix angle of respective teeth of said driving and driven helical gears.

* * * * *